C. B. REARICK.
CARRIAGE AND SWIVEL CUTTING HEAD FOR PLANERS.
APPLICATION FILED OCT. 14, 1918.

1,394,443.

Patented Oct. 18, 1921.
2 SHEETS—SHEET 1.

Inventor
Charles B. Rearick,
By
Attorney

WITNESS:

C. B. REARICK.
CARRIAGE AND SWIVEL CUTTING HEAD FOR PLANERS.
APPLICATION FILED OCT. 14, 1918.
1,394,443.
Patented Oct. 18, 1921.
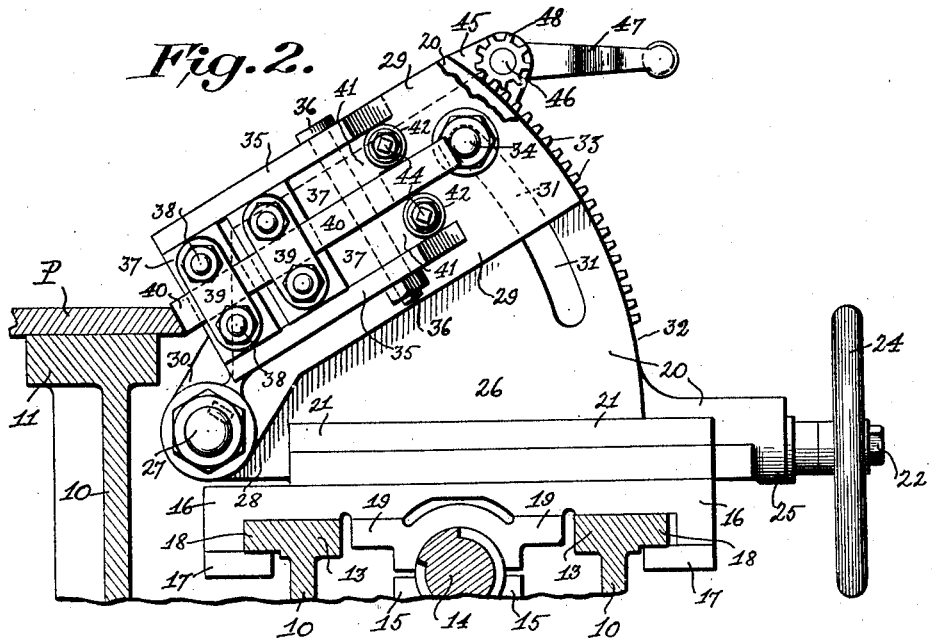
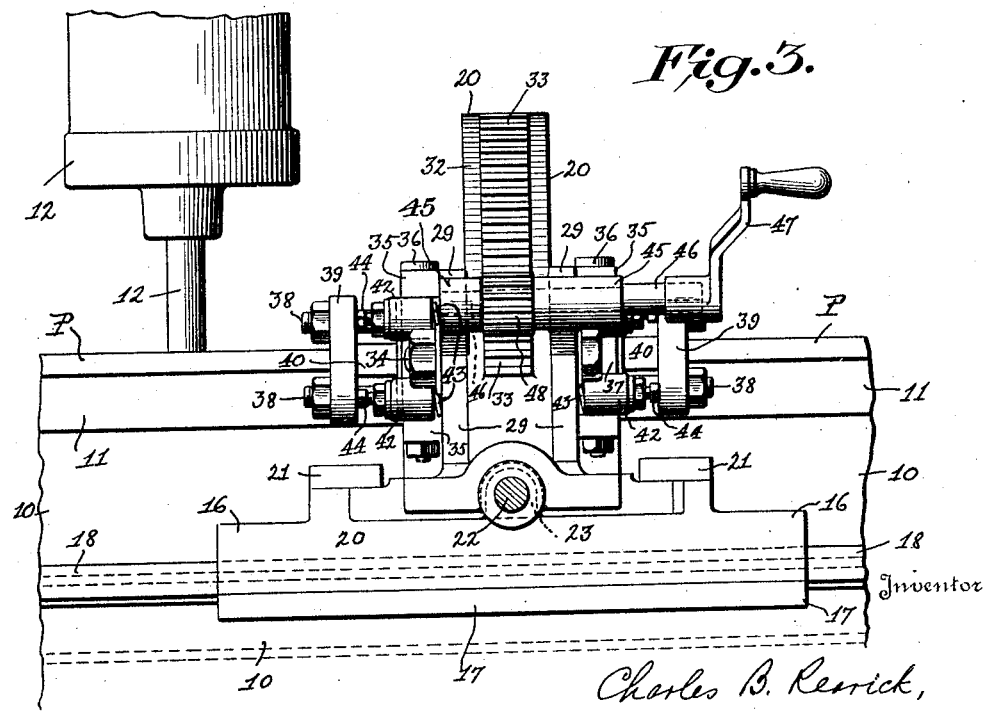

UNITED STATES PATENT OFFICE.

CHARLES B. REARICK, OF COVINGTON, VIRGINIA.

CARRIAGE AND SWIVEL CUTTING-HEAD FOR PLANERS.

1,394,443.

Specification of Letters Patent.

Patented Oct. 18, 1921.

Application filed October 14, 1918. Serial No. 258,001.

*To all whom it may concern:*

Be it known that I, CHARLES B. REARICK, a citizen of the United States, residing at Covington, in the county of Alleghany and State of Virginia, have invented new and useful Improvements in Carriage and Swivel Cutting-Heads for Planers, of which the following is a specification.

My invention relates to plate planers used in connection with shipyards, car manufacturing, boiler, and tank shops, and similar plants, and more particularly to the carriage and cutting head used in connection with planers so that the same may be adjusted in such a position as to enable the cutter to edge or plane the plate either at a right angle or any angle between a right angle and sixty degrees bevel, or any other desired angle.

The objects of my invention are:

First, to design a carriage and cutting head which is of a rigid and substantial design so as to more especially adapt the same for operation on long and heavy plates and enable the massive tool carrying elements to be quickly and accurately adjusted and rigidly locked to the different angles at which the tool is to plane the plate with a requirement of a minimum of effort and time.

Second, to devise a carriage and cutting head of the character above indicated in which is provided means for carrying two oppositely disposed cutting tool supports or aprons on the same head or post, and said supports or aprons are so constructed and interconnected that both tool supports or aprons with cutting tools secured thereto may be simultaneously adjusted to the same angle of cut and rigidly clamped in their adjusted position, whereby a cut can be accurately and uniformly made on the edge of an extended plate in either direction along the ways of the planer.

Third, to construct a carriage and cutting head for heavy and continuous work, capable of being cheaply manufactured with a minimum of parts, easily assembled, inspected and repaired and all the parts fully exposed and easily accessible in their locked or unlocked position.

Other advantages and objects of the invention will appear from the detailed description of the construction and mode of operation of the device to be presently disclosed.

My invention consists of structural characteristics and relative arrangements of elements which will be hereinafter more fully described and particularly pointed out in the appended claims.

In the accompanying two sheets of drawings similar reference characters indicate the same parts in the several figures in which:

Fig. 2, is a similar view as Fig. 1, with the swiveled tool supports or aprons in their elevated position, and Fig. 3, is a front elevation of the carriage and cutting head.

Figure 1:
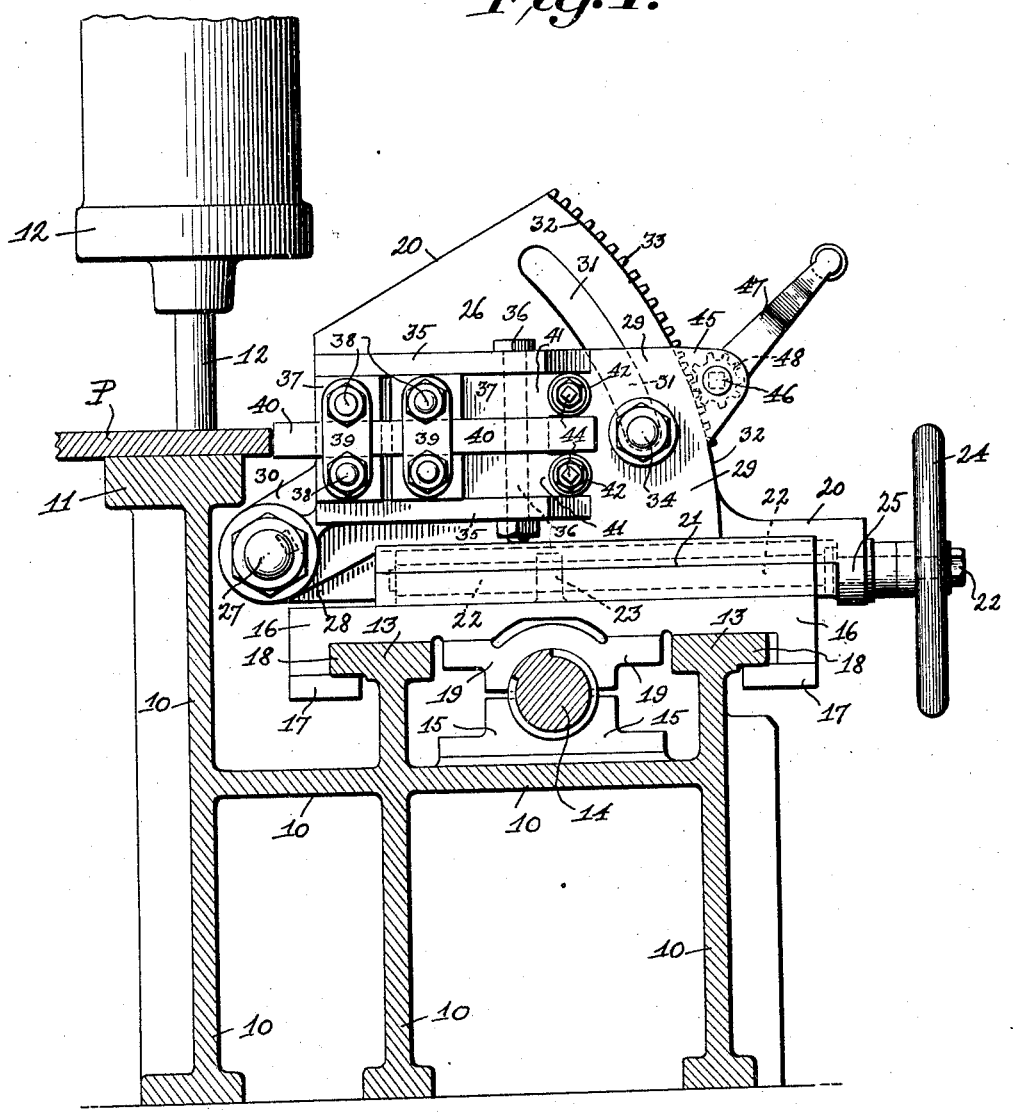
Figure 1, is an end view of the improved carriage and cutting head, showing a fragment of the bed, supporting ways, driving screw of the planer in section.

In the drawings, 10, is the frame of the planer which may be of any desired and proper construction and is provided with the usual bed 11, on which the work or plate P to be operated upon is securely held, and in the present case shown as clamped along its length by a series of separated pneumatic or hydraulic jacks 12. Said frame 10 is provided with the usual ways 13, 13 and common form of reversible driving screw 14 in bearing 15 for supporting and driving back and forth the carriage supporting the cutting tool holder as is common practice and need no further illustration. While applicant only shows a small fragment of the frame, bed, ways, and driving screw of the planer, it will be readily seen that the same can be extended to any length without in any way affecting the construction and operation of the carriage and swiveled cutting head comprising my invention.

Slidably supported on said ways 13, 13 is a carriage 16, which is held from lifting upwardly from said ways by inwardly turned flanges 17, 17 engaging the underside of the projecting outer ends 18, 18, as clearly shown in Figs. 1 and 2. The underside of said carriage 16 is provided with a depending threaded portion 19 adapted to engage the reversible driving screw 14, operated by any common and suitable motor and mechanism, not shown, for the purpose of reciprocating or moving the carriage 16 back and forth on the ways 13, 13 as is common in this class of inventions. The carriage 16 as mounted therein an elongated and flattened tool post 20, constructed and arranged to be moved on said carriage in guides 21, 21, in a direction transversely to the motion of said carriage on its ways 13, 13 by means of a screw 22, engaging an internally threaded lug 23, projecting upwardly from the center portion of the upper side of the carriage 16 as shown in Figs 1 and 2. Said screw 22 is rotated in either direction by means of a hand wheel 24 at its outer end and is prevented from having a longitudinal movement with respect to the post 20 by engaging a bearing 25, formed in the front end of said post.

Mounted on each of the flat and oppositely disposed sides 26 of the tool post 20 and keyed on a pivot clamp bolt 27 passing through the inner end or projection 28 of said post is a swiveled apron 29, provided with an apertured inner extension 30, through which passes said clamp bolt 27 as shown, thereby permitting both of said aprons 29 to have a partial rotary or swivel motion with said bolt 27, as a pivot, and against the sides 26 of the post 20, for purposes to be presently described.

Near the front end of the tool post 20 is provided an arcuate-shaped slot 31, which is arranged to be parallel and of the same curvature as the front convex surface or side 32 of the post 20, said side 32 having formed or cut therein or attached thereto, a series of teeth or rack 33, as illustrated. A clamping bolt 34 passes through suitable and registering openings in the swiveled aprons 29, 29, and extends through the slot 31, for the purpose of interconnecting said aprons 29, 29 and enabling them to move or swivel with the clamp bolt 27 as a single element and simultaneously on both sides of the post 20.

Near the upper and lower edges of each of the aprons 29, 29, and projecting from their outer sides are formed flanges 35. Through the outer end of each flange 35 is passed a bolt 36 adapted to pivotally engage a clapper-box 37 of the ordinary planer design, said clapper box carrying the studs 38, 38, and clamps 39, 39, for securely and rigidly holding the hardened steel tool 40 so that the cutting end of said tool 40 is pointed toward the end of the aprons 29 29 pivotally connected to the post 20. Extending from the outer end of the clapper-box 37 and beyond the bolt 36 are projections 41, 41, which carry hollow circular lugs 42, 42, in which are inserted coil springs 43, 43, the compression of which is capable of being regulated by set screws 44, 44, and are for the purpose of returning the clapper-box to the proper cutting position after the cutting tool 40 has passed over the plate on the return or idle stroke, as is common practice in cutting tools employed in planers.

On both of the aprons 29 is cast a projecting lug or extension 45 having formed therein a suitable bearing or support for a rotatable shaft 46, said shaft being provided at one end with a hand crank 47 and at its middle section with a pinion 48, meshing with the teeth of rack 33, on the tool post 20, as clearly shown in Fig. 3 and for purpose to be directly explained.

The operation of the invention is as follows:

Assuming the plate P has been securely fastened to the bed 11 of the planer by the jacks 12, and the tool post 20 has been properly adjusted, as shown in Fig. 1, in order to bring its rigidly clamped tool 40 in proper cutting position with respect to the edge of the plate P, the clamping bolts 27 and 34 are then tightly screwed up, thereby firmly and rigidly clamping with one operation each of the aprons 29 with their attached tools 40 to the tool post 20. When the driving screw 14 is rotated to move the carriage 16 in the proper direction, in order to have either one of the tools 40, on each side of the post 20, to make the desired cut, the hand wheel 24 is rotated in such a manner as to feed the cutting edge of the tool 40, the correct distance beyond the outer face of the plate P, when a cut will be effected which is at a right angle to the plane of the bed 11, or carriage 16 of the planer.

Should it be desired to make a cut of any other angle, the clamping bolts 27 and 34, are first sufficiently unscrewed as to release the binding between the tool post 20, and both aprons 29, 29. The hand crank 47 is then properly rotated, which in turn causes the pinion 48 to ride up on the rack 33, thereby simultaneously partially rotating the interconnected aprons 29, 29, with the combined swivel and clamp bolt 27. After the connected aprons 29 are elevated to the proper point, as shown for example, in Fig. 2, to effect the angular cut desired, the clamping bolts 27 and 34, are again screwed up tightly to firmly and immovably bind said aprons 29 to the rigid post 20, when the adjustment of the cutting edge of the tool 40 with respect to the face of the plate P, as heretofore explained, is repeated.

It will easily be understood from the preceding description that the tools 40 on each side of the post 20 are used alternately and the cutting head is adapted for cutting in either direction along the ways of the planer.

From the foregoing disclosure of the construction and operation of the improved cutting head, it will be readily seen that all the objects and advantages related in the statement of invention are fully satisfied and notwithstanding the parts employed are of great weight, massive and would ordinarily be cumbersome to handle, one person can operate and accurately make all adjustments of the planer, with no more physical effort or consumption of time than usually required in planers adapted for light work, and the bolts 27 and 34, not only perform the function, respectively, of pivotally supporting and interconnecting the two aprons 29, 29, so that said aprons are capable of being simultaneously swiveled and angularly adjusted with respect to the bolt 27 as a center, but said bolts 27 and 34 in addition to these functions, after the aprons 29, 29 have been adjusted to the proper cutting position of the tools 40, may be screwed up and made to efficiently and expeditiously lock said aprons to the tool post 20.

It will also be understood that while a projecting lug or extensions 45 is shown as formed or cast on each of the aprons 29 to form a double bearing or support for the rotatable shaft 46, this specific arrangement is not necessary, as the bearing on the apron 29 not carrying the hand crank 47 could be done away with, as shown in Fig. 2, without affecting the successful operation of the invention.

What I claim is:

1. A swivel cutting head for planers or the like comprising a reciprocating carriage, a tool post adjustably supported on said carriage, means for adjusting said tool post on and normal to the movement of said carriage, an apron pivotally connected at one end and on each of two opposite sides of said post, and means for securing a cutting tool on each of said aprons so that the cutting ends of the tools are pointed toward the ends of the aprons pivoted to said post.

2. A swivel cutting head for planers or the like comprising a reciprocating carriage, a tool post having opposite flat faces and adjustably supported on said carriage, means for adjusting said tool post on and normal to the movement of said carriage, an apron pivotally connected at one end and on each of the two opposite flat sides of said post, and means for securing a cutting tool on each of said aprons, so that the cutting ends of the tools are pointed toward the ends of the aprons pivoted to said post.

3. A swivel cutting head for planers or the like comprising a reciprocating carriage, a tool post having opposite flat faces and adjustably supported on said carriage, means for adjusting said tool post on and normal to the movement of said carriage, an apron pivotally connected at one end and on each of the two opposite sides of said post, means for securing a cutting tool on each of said aprons so that the cutting ends of the tools are pointed toward the ends of the aprons pivoted to said post, and means for simultaneously clamping the aprons to the tool post.

4. A swivel cutting head for planers or the like comprising a reciprocating carriage, a tool post having two opposite faces and adjustably supported on said carriage, means for adjusting said tool post on and normal to the movement of said carriage, an apron pivotally connected at one end and on each of the two opposite faces, means for interconnecting the two aprons, means for securing a cutting tool on each of said aprons, so that the cutting ends of the tools are pointed toward the ends of the aprons pivoted to said post, and means for simultaneously swinging said aprons on their pivotal connection.

5. A swivel cutting head for planers or the like comprising a reciprocating carriage, a tool post having two opposite faces and adjustably supported on said carriage, means for adjusting said tool post on and normal to the movement of said carriage, a combined clamping and pivot bolt carried by said post, an apron pivotally connected at one end by said bolt and on each of the two opposite faces of said tool post, means for securing a cutting tool on each of said aprons, so that the cutting ends of the tools are pointed toward the ends of the aprons pivoted to said post, and means for interconnecting said aprons for simultaneously swinging said aprons on their pivotal connections.

6. A swivel cutting head for planers or the like comprising a reciprocating carriage, a tool post having two opposite faces and adjustably supported on said carriage, means for adjusting said tool post on and normal to the movement of said carriage, an apron pivotally connected at one end and on each of the two opposite faces of said tool post, means for interconnecting the two aprons, means for securing a cutting tool on each of said aprons, so that the cutting ends of the tools are pointed toward the ends of the aprons pivoted to said post, and interengaging means on said tool post and one of said aprons for simultaneously swinging said aprons on their pivotal connections.

7. A swivel cutting head for planers or the like comprising a reciprocating carriage, a tool post having two opposite faces and adjustably supported on said carriage, means for adjusting said tool post on and normal to the movement of said carriage, a combined clamping and pivot bolt carried by said post, an apron pivotally connected at one end by said pivot bolt and on each of the two opposite faces of said tool post, means for securing a cutting tool on each of said aprons, so that the cutting ends of the tools are pointed toward the ends of the aprons pivoted to said post, and an auxiliary clamping bolt interconnecting said aprons for simultaneously swinging said aprons on their pivotal connections and locking the same against the tool post.

8. A swivel cutting head for planers or the like comprising a reciprocating carriage, a tool post having two opposite faces and adjustably supported on said carriage, means for adjusting said tool post on and normal to the movement of said carriage, an apron pivotally connected at one end and on each of the two opposite faces of said tool post, a clamp bolt passing through the tool post and interconnecting the two aprons, means for securing a cutting tool on each of said aprons, so that the cutting ends of the tools are pointed toward the ends of the aprons pivoted to said post, and interengaging means on said tool post and one of said aprons for simultaneously swinging said aprons on their pivotal connection.

9. A swivel cutting head for planers or the like comprising a reciprocating carriage, a tool post provided with two opposite faces connected by a slotted opening and adjustably supported on said carriage, means for adjusting said tool post on and normal to the movement of said carriage, a combined clamping and pivot bolt carried by said post, an apron pivotally connected at one end by said pivot bolt and on each of the two opposite faces of said tool post, a clamp bolt passing through the slotted opening and interconnecting the two aprons, means for securing a cutting tool on each of said aprons, so that the cutting ends of the tools are pointed toward the ends of the aprons pivoted to said post, and interengaging means on said tool post and one of said aprons for simultaneously swinging said aprons on the pivot bolt as a center.

10. A swivel cutting head for planers or the like comprising a reciprocating carriage, a tool post provided with two opposite faces connected by a slotted opening and adjustably supported on said carriage, means for adjusting said tool post on and normal to the movement of said carriage, a combined clamping and pivot bolt carried by said tool post at one end thereof, a rack on the other end of said tool post, an apron pivotally connected at one end by said pivot bolt and on each of the two opposite faces of said tool post, means for securing a tool on each of said aprons, a clamp bolt passing through the slotted opening and connected to the two aprons, and a pinion rotatably supported on one of said aprons and engaging said rack for simultaneously swinging said aprons on the pivot bolt as a center.

11. A swivel cutting head for planers or the like comprising a reciprocating carriage, a tool post having two opposite faces and adjustably supported on said carriage, means for adjusting said tool post on and normal to the movement of said carriage, an apron pivotally connected at one end and on each of the two opposite faces of said tool post, means for interconnecting the two aprons, means for securing a cutting tool on each of said aprons, so that the cutting ends of the tools are pointed toward the ends of the aprons pivoted to said post, and interengaging rack and pinion on said tool post and aprons for simultaneously swinging said aprons on their pivotal connections.

12. A swivel cutting head for planers or the like comprising a reciprocating carriage, a tool post having two opposite faces and adjustably supported on said carriage, means for adjusting said tool post on and normal to the movement of said carriage, an apron pivotally connected at one end and on each of the two opposite faces of said tool post, a clamp bolt passing through the tool post and interconnecting the two aprons, means for securing a cutting tool on each of said aprons, so that the cutting ends of the tools are pointed toward the ends of the aprons pivoted to said post, and interengaging rack and pinion on said tool post and aprons for simultaneously swinging said aprons on their pivotal connections.

13. A swivel cutting head for planers or the like comprising a reciprocating carriage, a tool post provided with two opposite faces connected by a slotted opening and adjustably supported on said carriage, means for adjusting said tool post on and normal to the movement of said carriage, a combined clamping and pivot bolt carried by said tool post at one end thereof, a rack on the other end of said tool post, an apron pivotally connected at one end by said pivot bolt and on each of the two opposite faces of said tool post, means for securing a tool on each of said aprons, a clamp bolt passing through the slotted opening and connected to the two aprons, and a pinion rotatably supported on said aprons and engaging said rack for simultaneously swinging said aprons on the pivot bolt as a center.

14. A swivel cutting head for planers or the like comprising a reciprocating carriage, a tool post having two opposite faces and adjustably supported on said carriage, means for adjusting said tool post on and normal to the movement of said carriage, a combined clamping and pivot bolt carried by said post, an apron pivotally connected at one end by said bolt and on each of the two opposite faces of said tool post, means for interconnecting the two aprons, means for securing a cutting tool on each of said aprons, and interengaging means on said tool post and one of said aprons for simultaneously swinging said aprons on the pivot bolt as a center.

In testimony whereof I affix my signature.

CHARLES B. REARICK.